(12) United States Patent
Kühne et al.

(10) Patent No.: US 8,281,462 B2
(45) Date of Patent: Oct. 9, 2012

(54) BUNDLE TIE

(75) Inventors: Tom Kühne, Vaxjo (SE); Larry Knutson, Klavreström (SE)

(73) Assignee: Morgan Ryman, Anderstorp (SE)

( * ) Notice: Subject to any disclaimer, the term of this patent is extended or adjusted under 35 U.S.C. 154(b) by 224 days.

(21) Appl. No.: 12/532,433

(22) PCT Filed: Mar. 17, 2008

(86) PCT No.: PCT/SE2008/000201
§ 371 (c)(1),
(2), (4) Date: Sep. 22, 2009

(87) PCT Pub. No.: WO2008/118057
PCT Pub. Date: Oct. 2, 2008

(65) Prior Publication Data
US 2010/0115738 A1      May 13, 2010

(30) Foreign Application Priority Data
Mar. 23, 2007   (SE) ...................................... 0700755

(51) Int. Cl.
*B65D 63/10* (2006.01)
(52) U.S. Cl. .......... 24/272; 24/273; 24/16 PB; 24/17 AP
(58) Field of Classification Search .................. None
See application file for complete search history.

(56) References Cited

U.S. PATENT DOCUMENTS

| | | | | |
|---|---|---|---|---|
| 1,517,196 A | * | 11/1924 | Cuppett | ........................... 24/272 |
| 5,577,698 A | * | 11/1996 | Liu et al. | ........................ 248/214 |
| 7,032,415 B2 | | 4/2006 | Young | |

FOREIGN PATENT DOCUMENTS

| | | |
|---|---|---|
| FR | 2849146 A1 | 6/2004 |
| GB | 2356220 A | 5/2001 |

OTHER PUBLICATIONS

International Search Report for corresponding International Application PCT/SE2008/000201.
International Preliminary Report on Patentability for corresponding International Application PCT/SE2008/000201.

\* cited by examiner

*Primary Examiner* — Jack W. Lavinder
(74) *Attorney, Agent, or Firm* — WRB-IP LLP

(57) ABSTRACT

A bundle tie or strap has a locking device provided with a through-going channel, in which locking device there is secured an elongate strip. The strip and the channel have counterdirected teeth, whereby the strip is insertable in the channel but not withdrawable therefrom. For infeed of the strip in the channel and for tightening, there is pivotally connected to the locking device a feeder crank with teeth on a circle sector shaped portion. The bundle tie is manufactured in its entirety in the opened state by injection moulding in one single continuous piece.

16 Claims, 4 Drawing Sheets

BUNDLE TIE

BACKGROUND AND SUMMARY

The present invention relates to a bundle tie or strap with a locking device with a through-going slot or channel with locking means, an elongate strip fixedly secured in the locking device and provided with corresponding locking means, whereby the free end of the strip is insertable in one direction in the channel but not withdrawable therefrom.

Bundle ties of the type intimated by way of introduction are previously known in the art and largely function satisfactorily, for example for holding together the cables included in a cable bunch or cluster.

The prior art bundle ties or straps must be tightened manually by grasping with one hand the locking device of the bundle tie and using the other hand to pull the free end of the bundle tie. No major locking force can be generated in this manner, since the locking device is small and difficult to grip. In order to remedy the above-outlined problem with difficulties in hard tightening of a conventional bundle tie or strap, there are special guns or tools for tightening the tie or strap. With the aid of such a tool, a satisfactory tightening of the bundle tie can be achieved. However, it may be perceived by many users as a problem to always have the special tool available when a bundle tie is to be used.

The above-mentioned bundle tie is a single-use disposable item, which cannot be opened and reused when the bundle tie is finally tightened.

Reusable bundle ties or straps are also previously known in the art, where the locking device or its locking means is movable to a free position, where it no longer engages with the corresponding means on the strap or tie proper. The problem involved in tightening remains unresolved however also in this type of prior art bundle tie.

It is desirable to design the bundle tie or strap disclosed by way of introduction in such a manner that it can be tightened with extreme force without the need for special tools. It is desirable to design the bundle tie or strap in such a manner that it can be manufactured in a rational manner using an injection moulding tool. Further, it is desirable to design the bundle tie or strap such that it can be produced for reuse, i.e. be releasable or openable after tightening.

In a bundle tie or strap according to an aspect of the present invention, there is pivotally connected to the locking device a feeder crank which has a portion with a rolling surface with feeder means for cooperation with the locking means of the bundle tie or strap for infeed thereof in the channel.

BRIEF DESCRIPTION OF THE ACCOMPANYING DRAWINGS

The present invention will now be described in greater detail hereinbelow, with reference to the accompanying Drawings. In the accompanying Drawings.

The present invention will be described as a bundle tie, but the skilled reader of this specification will readily perceive that it could just as well serve the function of a bundle strap.

DETAILED DESCRIPTION

Figure 1:
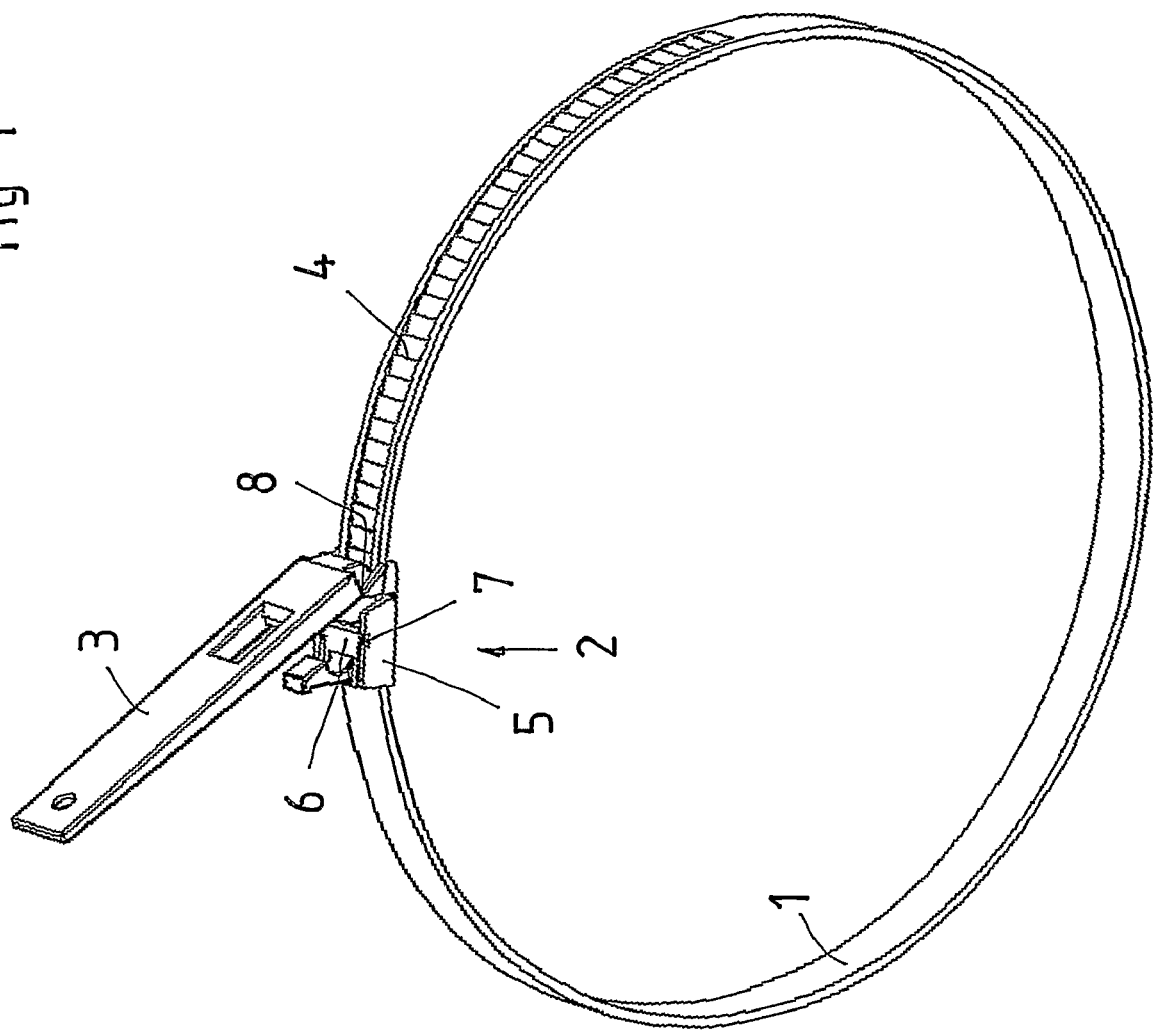
FIG. 1 is a perspective view of a bundle tie according to the present invention in one state where the free end of the bundle tie has just been inserted in the locking device of the bundle tie.

FIG. 1 shows in perspective a bundle tie in a state where the free end of the bundle tie has just been inserted in a locking device included in the bundle tie. hi the Figure, reference numeral 1 relates to the strip of the bundle tie, reference numeral 2 relates to the locking device of the bundle tie and reference numeral 3 to a feeder crank included in the bundle tie. Interiorly in the locking device 2, there is disposed a through-going slot or channel 20 (FIG. 4) with a number of locking means in the form of teeth or barbs, the locking means being disposed to cooperate with corresponding locking means 4 on the strip 1. The cooperation between the locking means in the locking device 2 and on the strip is such that the strip may be pushed manually into the channel or slot of the locking device 2 but cannot be pulled out therefrom again. In order to realise this feature, the locking means must either be inherently somewhat resilient, or at least that part on which the locking means is disposed in the locking device must also be slightly resilient.

It will be apparent from FIG. 1 that the locking device 2 has two opposing side walls 5 (of which only one is shown more or less clearly) and a pivotally disposed central portion 6 between these two side walls, the central portion supporting the locking means of the locking device 2. The central portion 6 is connected to both of the side walls 5 by the intermediary of bridges 7 which fulfil the function of springing to permit a slight pivotal movement.

The feeder crank 3 is pivotal within a sector of approximately 180°, where the position illustrated in FIG. 1 can be an intermediate position, approximately centrally in the pivot range. This implies that the feeder crank 3 is pivotal so that, in its one end position, it rests against the strip which leaves the locking device 2 (to the left in FIG. 1), and in the other end position lies along the strip where the locking means 4 are disposed. In order to realise such a pivotal capability in the feeder crank 3, this is connected to the locking device 2 by the intermediary of two pivots 8 which are produced from relatively thin and flexible portions of the plastic material from which the bundle tie is injection moulded. The pivots 8 could possibly also be designated as film hinges.

Figure 2:
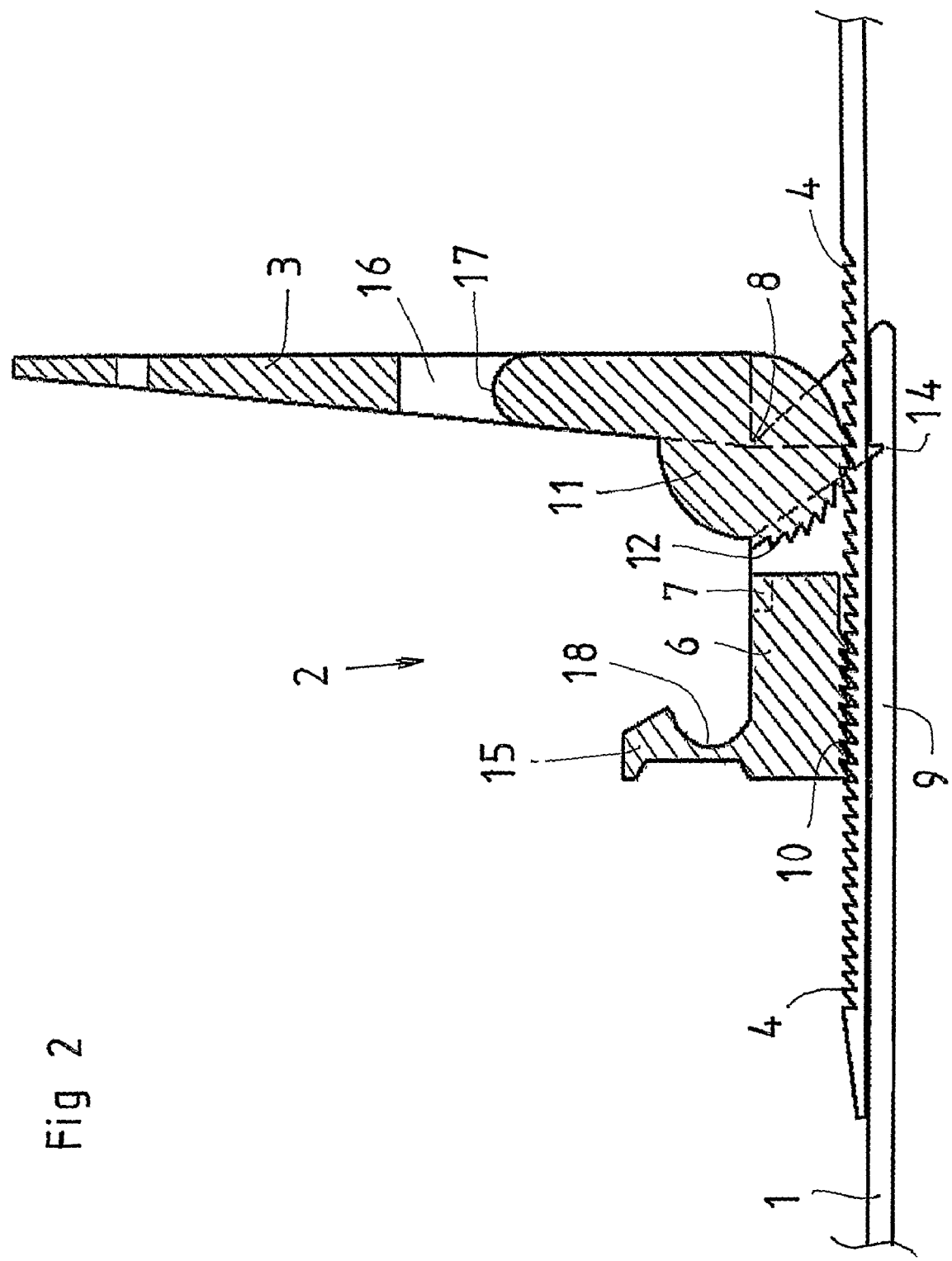
FIG. 2 is a longitudinal section through the bundle tie according to FIG. 1.

FIG. 2 shows a longitudinal cross section of the bundle tie according to FIG. 1. It will be apparent from the Figure that the locking device 2 has a base plate 9 from which the bundle tie 1 extends in a direction to the left. The base plate 9 is connected to both of the side walls 5 and is of one piece manufacture with them. This implies that, between the upper side of the base plate 9 (in FIG. 2) and the underside of the central portion 6 of the locking device 2, there is a through-going channel or slot through which the strip 1 may be passed. The underside of the central portion 6 is, as was mentioned above, provided with locking means 10 which are complementary to the locking means 4 of the strip 1. If the strip in FIG. 1 is slid in a direction to the left, the locking means 4 and 10 will "mesh over" in that the central portion 6 springs slightly upwards in order thereafter to spring back when the locking means lie in register with one another.

As is apparent from FIG. 2, the feeder crank 3 has a portion 11 with a rolling surface which, at least along a part of its periphery, is provided with feeder devices 12 for feeding the strip 1 into the locking device 2. The feeder devices 12 may suitably be approximately complementary to the locking means 4 on the strip 1. The rolling surface may be substantially arcuate and is disposed on the corresponding (circle sector shaped) portion 11 on the feeder crank 3.

Depending on the elasticity of the plastic material from which the bundle tie is manufactured, and thereby also the two pivots 8, 14 (see below), which the bundle tie includes, the configuration of the rolling surface may be modified from the exact arcuate configuration to a slightly different arched form, so that satisfactory cooperation is always attained between the locking means 4 and the feeder devices 12.

It will be apparent from FIG. 1 that the locking means 4 on the strip 1 only take up a part of the width of the strip and that they are countersunk in the thickness direction. In order for the feeder devices 12 on the circle sector shaped portion 11 to be able to engage with the locking means, the axial extent (the thickness) of the circle sector shaped portion is less than the width of the locking means of the strip 1. This implies that the feeder crank 3 and in particular its circle sector shaped portion, is considerably narrower than the external width of the locking device 2. The pivots 8, which connect the feeder crank 3 with the locking device 2, can therefore be given considerable length in the direction of the pivot axis of the pivots and consequently provide good mechanical strength.

According to the present invention, the locking means 4 can also cover the entire width of the strip 1. Nor need they be countersunk in the strip, even if this is advantageous, by the guiding function provided. On the other hand, the width of the rolling surface (and of the portion 11) need not be greater than as to provide the pivots 8 with sufficient length in the axial direction.

If, in FIG. 2, the feeder crank 3 is pivoted in a counterclockwise direction, the feeder devices 12 of the feeder crank will "mesh over" the locking means 4 on the strip 1. On a return pivot of the feeder crank 3 in a clockwise direction, the feeder devices 12 will, on the other hand, slide the strip 1 into the locking device 2. By pumping the feeder crank, it is thus possible to feed in the strip through the locking device 2 and, in the final phase of such an infeeding operation, also to tighten the strip 1 hard about en object which is to be clamped.

Naturally, the strip can also be pushed/pulled manually through the channel so that the feeder crank 3 is only used for the final tightening.

The meshing over between the feeder devices 12 and the locking means 4 is realised in that the base plate 9 is slightly resilient and, for the greater part, lacks side walls in the area of the circle sector shaped portion 11. In addition, one or both of the pivots 8, 14 (see below) can be made slightly resilient.

Furthermore, concerning the sector shaped portion 11, it might be mentioned that the above-described pivots 8 between the feeder crank 3 and the locking devices 12 are located at the centre of the rolling surface along which the feeder devices 12 are disposed.

A bundle tie of the type under consideration here is a mass-produced article, which must be able to be manufactured in large series and at low cost. According to the present invention, this is put into effect in that the bundle tie is injection moulded in one continuous piece of material. The pivots 8 between the feeder crank 3 and the locking device 2 are one element in this construction philosophy.

Figure 3:
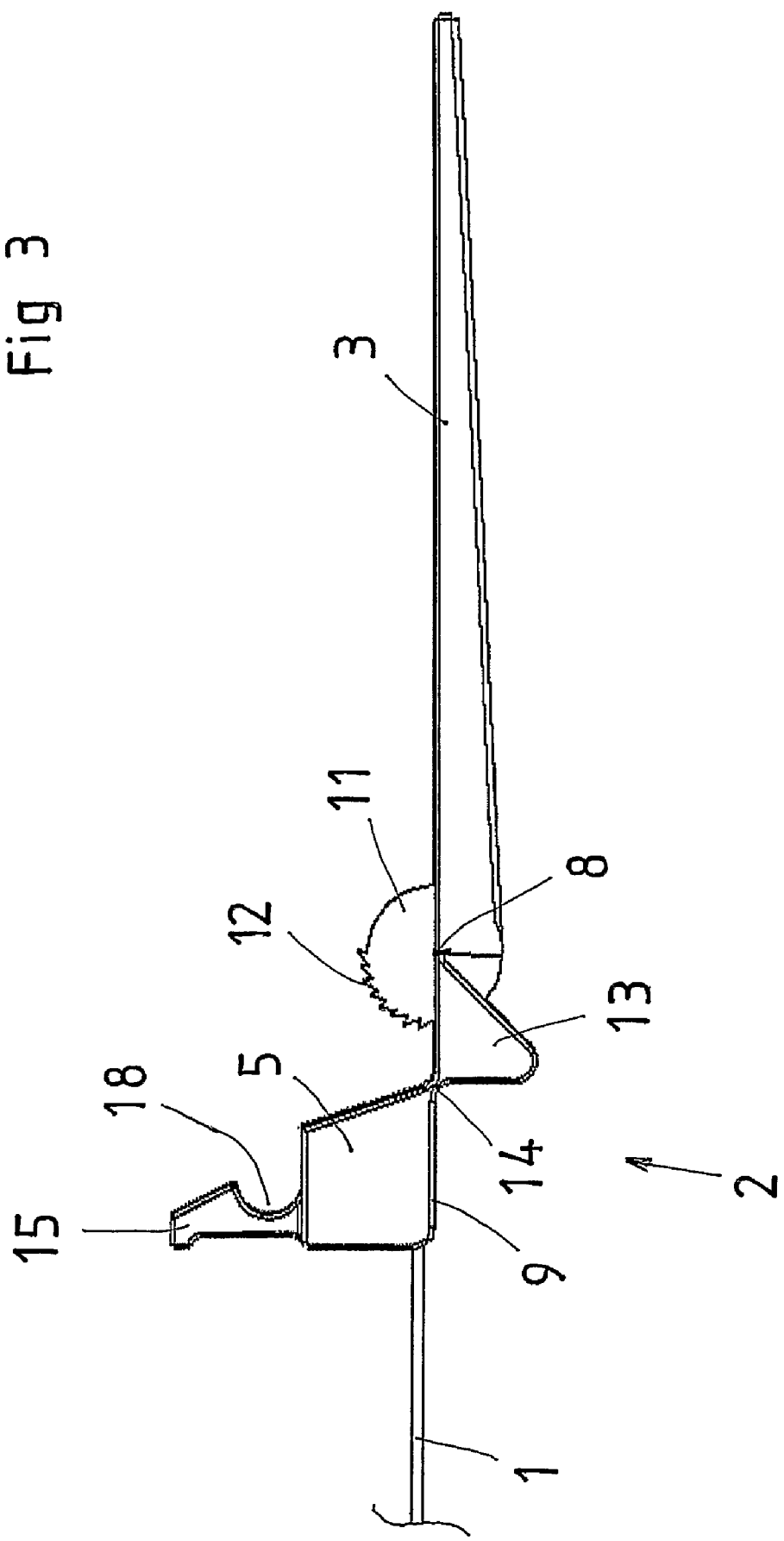
FIG. 3 shows the bundle tie according to FIG. 1 in the opened, planar position of manufacture.

In order to make possible injection moulding of the bundle tie in its entirety, it has a flattened, planar state which is shown in FIG. 3 and which is that state in which it is injection moulded on manufacture. It will be apparent from FIG. 3 that, between the side walls 5 and the pivots 8, there is a pivotal portion 13 which, in FIG. 3, the manufacturing position, is pivoted approximately at 90° in relation to that shown in FIG. 2. This is possible in that the pivotal portion 13 is connected with the rest of the locking device 2 via a pivot 14 of the same basic appearance as the pivots 8. It will be apparent that the pivots 8 and the pivot 14 have their pivot axes parallel with one another regardless of the pivotal position of the pivotal portion 13. Further, these pivot axes are in or parallel with the plane of extent of the strip 1 when this is inserted in the locking device 2 and moreover transversely directed in relation to the longitudinal direction of the strip.

In order to transfer the bundle tie according to the present invention from the manufacturing position according to FIG. 3 to a position of use, the pivotal portion 13 is quite simply pivoted through approximately 90° in a counterclockwise direction to the position according to FIG. 2. In this position, the bundle tie is ready for use.

It will be apparent from FIGS. 2 and 3 that the central portion 6 in the locking device 2 has an upwardly directed projection 15, which can be given the function of an operating handle if the bundle tie is to be opened. In the embodiment according to FIGS. 2 and 3, this takes place in that the upper end of the projection 15 is lifted or pivoted in an upward direction and to the right in FIG. 2 so that a twisting takes place around the bridges 7. In this context, use is made of the resilient or springing properties of the material of the bundle tie, in particular in the bridges 7 in order to render the central portion return springing to the locking position illustrated in FIG. 2.

Taking as a point of departure a position where the strip 1 is tightened so hard about an object as possible, e.g. as illustrated in FIG. 2, the feeder crank 3 can still be pivoted in a counterclockwise direction in that the feeder devices 12 "mesh over" the locking means 4 of the strip 1. If such a pivoting of the feeder crank 3 is continued, the projection 15 will arrive in an opening 16 in the feeder crank. It will be apparent that the one edge 17 of the opening is arched and that there is a corresponding recess 18 in the projection 15 on its side facing towards the feeder crank 3.

If the feeder crank is pivoted maximally in a counterclockwise direction, the projection 15 will snap into the opening 16 in a position where the longitudinal direction of the feeder crank 3 is approximately parallel with the longitudinal direction of the strip 1 and the base plate 9. If, in this position, the strip 1 is maximally taut, it is not possible to pivot back the feeder crank 3, since this would entail that the strip 1 is pushed further into the locking device 2. By such means, the bundle tie according to the invention, in the described embodiment, can be deemed to be sealed, since reopening can no longer take place.

For reasons of production engineering, the base plate 9 has an opening at least in that region where the locking means 10 of the central portion 6 are located. For the same reason, the feeder devices 12 are disposed along approximately a quarter of the periphery of the sector shaped portion 11.

Figure 4:
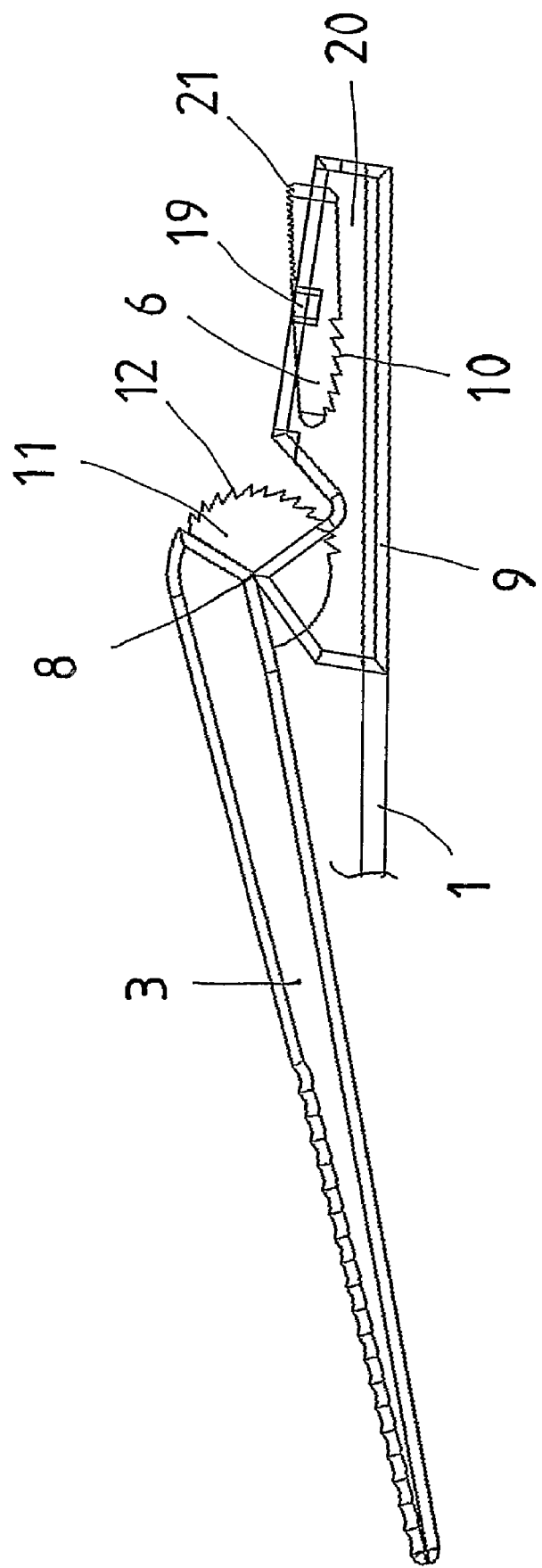
FIG. 4 shows a modified embodiment of the bundle tie according to the present invention.

FIG. 4 shows a modified embodiment of the bundle tie according to the present invention. The most tangible difference is that the central portion 6 lacks the projection 15. Further, the central portion 6 is connected to the side walls of the locking device 2 by the intermediary of the bridges 19, which permits a certain pivoting of the central portion 6 so that its locking means 10 can move away from the inside of the base plate 9 but return spring back towards it. If the front end of a strip is inserted in the channel 20 between the underside of the central portion 6 and the upper side of the base plate 9, the locking means 10 will snap down into the locking means 4 of the strip 1. Further, it is possible, as soon as the front end of the strip 1 has come down in the region under the sector shaped portion 11 of the feeder crank 3, to pull the strip by a pumping action in through the channel 20 in the locking device 2. In this embodiment, the strip is pulled, unlike the previously described embodiment where the strip is pushed.

As was mentioned above, the central portion 6 is resilient about the bridges 19 with a spring pretensioning in a counterclockwise direction. If the rear region 21 of the central portion 6 is pressed down against the upper side of the base plate 9, the locking means 10 will be disengaged from the corresponding locking means 4 on the strip 1. hi other words, the bundle tie according to FIG. 4 is readily reusable in that it can be opened in a simple manner. Nevertheless, the possibility exists of tightening the bundle tie without the need for special tools.

What is claimed is:

1. A bundle tie or strap comprising a locking device with a through-going channel with locking means, an elongate strip secured in the locking device and provided with corresponding locking means, the free end of the strip being insertable in one direction in the channel, but not withdrawable therefrom, a feeder crank being pivotally connected to the locking device, the feeder crank having a portion with a surface with feeder devices for cooperation with the locking means on the strip for infeed thereof in the channel, wherein the bundle tie comprises a single, continuous material piece, wherein the locking device includes a pivotal pivot portion, in which the feeder crank is pivotally secured, a pivot axis between the pivot portion and the feeder crank and a pivot axis between the pivot portion and the remainder of the locking device being parallel with one another and the plane of extent of the strip where this is inserted in the locking device but at right angles to the longitudinal direction of the strip.

2. The bundle tie or strap as claimed in claim 1, wherein it has an opened manufacture position where the strip and the feeder crank approximately lie in a common plane, the pivot axes between the feeder crank and the pivotal portion and between the pivotal portion and the remainder of the locking device lying in a common plane which is parallel with or coincides with the plane of the strip and the feeder crank.

3. The bundle tie or strap as claimed in claim 1, wherein the locking device has a resilient portion which supports the locking means of the locking device movable against the spring action from a locking position to an open position, where the locking means of the strip are movable out of engagement.

4. The bundle tie or strap as claimed in claim 3, wherein the resilient portion and the feeder crank have engagement means movable into an engagement position with one another, the resilient portion being locked in its locking position in the engagement position.

5. A bundle tie or strap comprising a locking device with a through-going channel with locking means, an elongate strip secured in the locking device and provided with corresponding locking means, the free end of the strip being insertable in one direction in the channel, but not withdrawable therefrom, a feeder crank being pivotally connected to the locking device, the feeder crank having a portion with a surface with feeder devices for cooperation with the locking means on the strip for infeed thereof in the channel, wherein the bundle tie comprises a single, continuous material piece, the locking device has a resilient portion which supports the locking means of the locking device movable against spring action from a locking position to an open position, where the locking means of the strip are movable out of engagement, and the resilient portion and the feeder crank have engagement means movable into an engagement position with one another, the resilient portion being locked in its locking position in the engagement position.

6. A bundle tie or strap comprising a locking device with a through-going channel with locking means, an elongate strip secured in the locking device and provided with corresponding locking means, the free end of the strip being insertable in one direction in the channel, but not withdrawable therefrom, a feeder crank being pivotally connected to the locking device, the feeder crank having a portion with a surface with feeder devices for cooperation with the locking means on the strip for infeed thereof in the channel, wherein the bundle tie comprises a single, continuous material piece, the portion with the feeder devices is substantially circle sector shaped, the locking device has a resilient portion which supports the locking means of the locking device movable against the spring action from a locking position to an open position, where the locking means of the strip are movable out of engagement, and, wherein the resilient portion and the feeder crank have engagement means movable into an engagement position with one another, the resilient portion being locked in its locking position in the engagement position.

7. A bundle tie or strap comprising a locking device with a through-going channel with locking means, an elongate strip secured in the locking device and provided with corresponding locking means, the free end of the strip being insertable in one direction in the channel, but not withdrawable therefrom, a feeder crank being pivotally connected to the locking device, the feeder crank having a portion with a surface with feeder devices for cooperation with the locking means on the strip for infeed thereof in the channel, wherein the bundle tie consists of a single, continuous material piece.

8. The bundle tie or strap as claimed in claim 7, wherein the portion with the feeder devices is substantially circle sector shaped.

9. The bundle tie or strap as claimed in claim 8, wherein the locking device has a resilient portion which supports the locking means of the locking device movable against the spring action from a locking position to an open position, where the locking means of the strip are movable out of engagement.

10. The bundle tie or strap as claimed in claim 7, wherein the locking device has a resilient portion which supports the locking means of the locking device movable against spring action from a locking position to an open position, where the locking means of the strip are movable out of engagement.

11. The bundle tie or strap as claimed in claim 7, wherein the material piece is plastic.

12. The bundle tie or strap as claimed in claim 7, wherein the locking device has a resilient portion which supports the locking means of the locking device movable against the spring action from a locking position to an open position, where the locking means of the strip are movable out of engagement.

13. A bundle tie or strap comprising a locking device with a through-going channel with locking means, an elongate strip secured in the locking device and provided with corresponding locking means, the free end of the strip being insertable in one direction in the channel, but not withdrawable therefrom, a feeder crank being pivotally connected to the locking device, the feeder crank having a portion with a surface with feeder devices for cooperation with the locking means on the strip for infeed thereof in the channel, wherein the bundle tie comprises a single, continuous material piece, the portion with the feeder devices is substantially circle sector shaped, and the locking device includes a pivotal pivot portion, in which the feeder crank is pivotally secured, a pivot axis between the pivot portion and the feeder crank and a pivot axis between the pivot portion and the remainder of the locking device being parallel with one another and the plane of extent of the strip where this is inserted in the locking device but at right angles to the longitudinal direction of the strip.

14. The bundle tie or strap as claimed in claim 13, wherein it has an opened manufacture position where the strip and the feeder crank approximately lie in a common plane, the pivot axes between the feeder crank and the pivotal portion and between the pivotal portion and the remainder of the locking device lying in a common plane which is parallel with or coincides with the plane of the strip and the feeder crank.

15. A bundle tie or strap comprising a locking device with a through-going channel with locking means, an elongate strip secured in the locking device and provided with corresponding locking means, the free end of the strip being insertable in one direction in the channel, but not withdrawable therefrom, a feeder crank being pivotally connected to the locking device, the feeder crank having a portion with a surface with feeder devices for cooperation with the locking means on the strip for infeed thereof in the channel, wherein the bundle tie comprises a single, continuous material piece, wherein the locking device includes a pivotal pivot portion, in which the feeder crank is pivotally secured, a pivot axis between the pivot portion and the feeder crank and a pivot axis between the pivot portion and the remainder of the locking device being parallel with one another and the plane of extent of the strip where this is inserted in the locking device but at right angles to the longitudinal direction of the strip, the bundle tie has an opened manufacture position where the strip and the feeder crank approximately lie in a common plane, the pivot axes between the feeder crank and the pivotal portion and between the pivotal portion and the remainder of the locking device lying, in a common plane which is parallel with or coincides with the plane of the strip and the feeder crank, and the locking device has a resilient portion which supports the locking means of the locking device movable against the spring action from a locking position to an open position, where the locking means of the strip are movable out of engagement.

16. The bundle tie or strap as claimed in claim 15, wherein the resilient portion and the feeder crank have engagement means movable into an engagement position with one another, the resilient portion being locked in its locking position in the engagement position.

\* \* \* \* \*